Nov. 9, 1926.

J. T. McCUTCHEON

OIL FILTER

Filed Nov. 4, 1925

1,606,647

N. G. Thomas

WITNESS:

J. T. McCutcheon INVENTOR

BY Victor J. Evans

ATTORNEY

Patented Nov. 9, 1926.

1,606,647

UNITED STATES PATENT OFFICE.

JOHN T. McCUTCHEON, OF GAINESVILLE, TEXAS.

OIL FILTER.

Application filed November 4, 1925. Serial No. 66,820.

This invention relates to an oil filter, the general object of the invention being to provide a novel form of filtering medium which will prevent clogging of the filter, while thoroughly removing dirt and other foreign matter from the oil passing through the same.

Another object of the invention is to so construct the filtering medium that it can be easily and quickly removed from the filter and cleaned.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
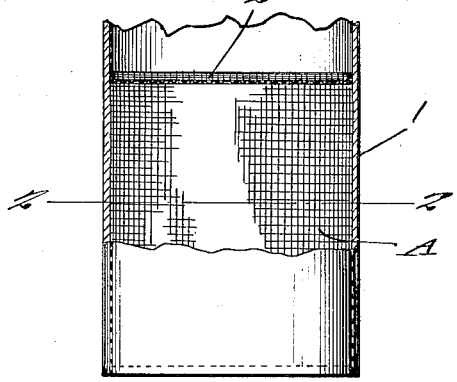
Figure 1 is a sectional view through a filter.
Figure 3:
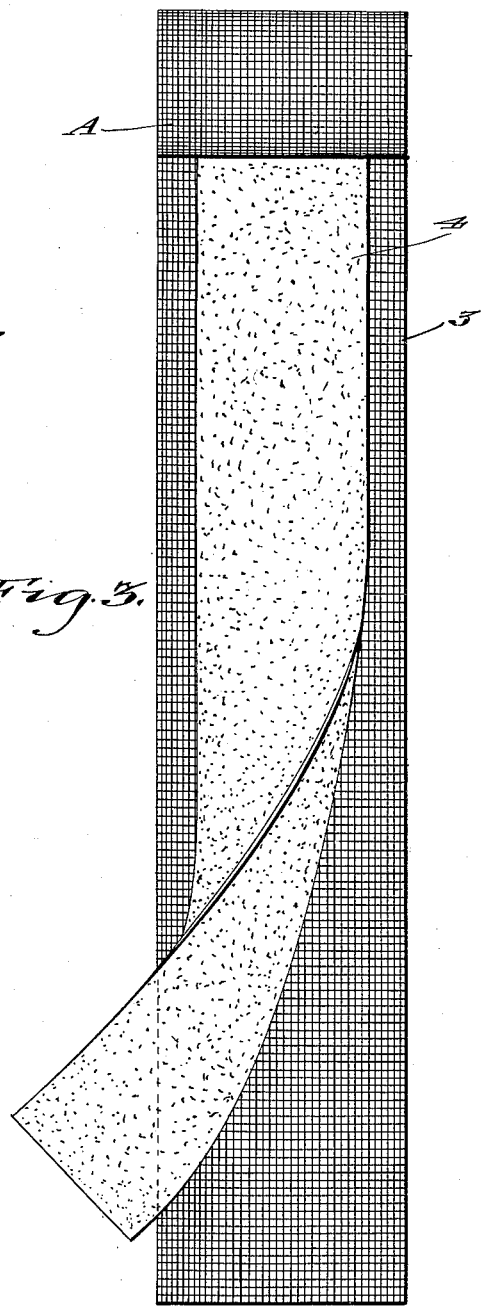
Figure 3 is a view of the filtering medium, partly unwrapped.
Figure 2:
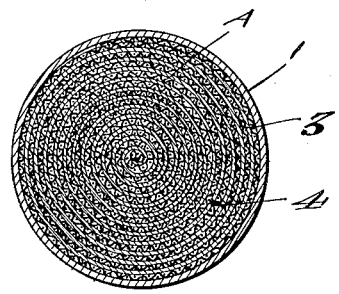
Figure 2 is a section on line 2—2 of Figure 1.

As shown in these views, the filtering medium shown at A is formed in the shape of a roll which is placed endwise in the casing 1 of the filter below the screen 2, the bottom of the casing being open so that one end of the filtering medium is exposed. The roll of filtering material snugly fits in the casing so that it will remain in place through friction. The filtering medium is composed of a strip 3 of burlap or the like and a strip 4 of chamois, the chamois being of less width than the burlap. The two strips are placed together with the chamois and burlap and then the two strips are rolled together to form the cylindrical shaped filtering member.

When the parts are assembled, the oil to be filtered will pass up through the roll of material and through the screen 2. It is thus caused to pass through the strips 3 and 4 which will separate the foreign matter from the oil, and I have found that this type of filter will not easily clog and can be used for a long time without requiring cleaning. When it does require cleaning, it can be easily removed from the casing and the two strips unwrapped and washed to remove the foreign matter therefrom. Then they can be rerolled and placed in the casing again.

By making the burlap strip of greater width than the chamois strip, the liquid will pass into the roll without obstruction from the chamois and will pass from the roll in the same manner.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A filter comprising a casing and a filtering roll therein, said roll comprising a strip of burlap and a strip of chamois which is of less width than the burlap, the two strips being placed one on the other and rolled to form a plug which is placed endwise in the casing.

In testimony whereof I affix my signature.

JOHN T. McCUTCHEON.